United States Patent
Wares et al.

(10) Patent No.: US 12,343,851 B2
(45) Date of Patent: Jul. 1, 2025

(54) UNIVERSAL END CLAMP

(71) Applicant: Unirac, Inc., Albuquerque, NM (US)

(72) Inventors: Brian Wares, Sacramento, CA (US); Ethan M. Ely, San Jose, CA (US)

(73) Assignee: Unirac, Inc., Albuquerque, NM (US)

( * ) Notice: Subject to any disclaimer, the term of this patent is extended or adjusted under 35 U.S.C. 154(b) by 250 days.

(21) Appl. No.: 17/901,495

(22) Filed: Sep. 1, 2022

(65) Prior Publication Data
US 2024/0075588 A1    Mar. 7, 2024

(51) Int. Cl.
*B25B 5/10* (2006.01)
*H02S 20/20* (2014.01)

(52) U.S. Cl.
CPC .............. *B25B 5/10* (2013.01); *H02S 20/20* (2014.12)

(58) Field of Classification Search
CPC .......... B25B 5/102; B25B 5/003; B25B 5/10; B25B 5/103; B25B 5/101; B25B 1/2473; H02S 20/20; H02S 30/00
USPC ................................................. 269/138, 234
See application file for complete search history.

(56) References Cited

U.S. PATENT DOCUMENTS

| | | | |
|---|---|---|---|
| 8,376,298 B2 * | 2/2013 | McPheeters | F24S 25/61 411/80 |
| 9,080,792 B2 * | 7/2015 | Patton | H02S 20/10 |
| 9,585,806 B2 | 3/2017 | Herrig | |
| 9,893,677 B1 | 2/2018 | Liu | |
| 10,451,315 B2 | 10/2019 | Harris et al. | |
| 11,221,034 B1 * | 1/2022 | Katz | F24S 25/65 |
| 11,274,855 B2 | 3/2022 | Harris et al. | |
| 2014/0338729 A1 * | 11/2014 | Newman | H02S 20/10 136/251 |
| 2016/0361219 A1 | 12/2016 | Herrig | |
| 2019/0049151 A1 | 2/2019 | Harris et al. | |
| 2019/0338988 A1 * | 11/2019 | Harris | H02S 20/00 |
| 2021/0156413 A1 | 5/2021 | Stephan et al. | |

FOREIGN PATENT DOCUMENTS

| | | |
|---|---|---|
| KR | 10-2228834 B1 | 3/2021 |
| WO | WO 2016/200610 A9 | 12/2016 |

OTHER PUBLICATIONS

International Search Report and Written Opinion Issued Jan. 12, 2024 in PCT/US2023/031667, 10 pages.

* cited by examiner

*Primary Examiner* — C. A. Rivera
(74) *Attorney, Agent, or Firm* — Lee & Hayes, P.C.

(57) ABSTRACT

An end clamp for installation of a solar module includes a cap member that is installed in an opening of a rail. The end clamp also includes an assembly having a slider member and a base member, and also includes a fastener that attaches the assembly to the cap member. The slider member moves relative to the base member to clamp down on a flange of the solar module based on tightening of the fastener.

18 Claims, 13 Drawing Sheets

UNIVERSAL END CLAMP

FIELD

The present disclosure is related to solar module mounting systems, and specifically to a universal end clamp used to attach a solar module to the rails of the mounting system.

BACKGROUND

Certain solar module mounting systems are designed to mount solar modules on sloped surfaces, such as a sloped roof. These systems can include rails that are attached to the roof and to which the solar modules are affixed. The solar modules are affixed to the rails using clamps made to fit both the contours of the rails and the contours of the solar module. In addition, the end of the rails must be covered, typically by a separate cover that is separate from a clamp used to clamp a solar module at the end of the rail.

Different solar module designs can have different form factors, requiring different end clamps in order to be attached to the rails of a mounting system. Since, as noted above, end clamps are typically designed to fit the contours of the solar module, a manufacturer and/or installer must manufacture and/or stock several different end clamp designs in order to accommodate different solar modules. Thus, it would be advantageous to have a single end clamp design that accommodates different solar module designs, and that also integrates a cover for the end of a rail in order to reduce the number of end clamps that must be manufactured and/or maintained in stock.

SUMMARY

The inventive concepts in the present disclosure have been developed in order to address the existing issues with conventional clamps used in solar module installation systems, and offer solutions such as the ability to use one end clamp design for several different solar modules.

In an exemplary aspect, an end clamp for installation of a solar module includes a cap member that is installed in an opening of a rail, and an assembly including a slider member and a base member. The end clamp also includes a fastener to attach the cap member to the assembly. The slider member is configured to move relative to the base member to clamp down on a flange of the solar module.

In an exemplary aspect, the base member includes a first set of grooves to receive the slider member, and at least a portion of each groove of the first set of grooves is angled to allow the slider member to pivot as the slider member moves relative to the base member.

In an exemplary aspect, the slider member moves relative to the base member in response to tightening of the fastener.

In an exemplary aspect, the assembly further includes a spring member disposed between the slider member and the base member, and the spring member returns the slider member to an original position relative to the base member when the fastener is loosened.

In an exemplary aspect, the cap member includes at least one fin to be inserted into the opening of the rail in order to align the cap member relative to the rail.

In an exemplary aspect, the cap member includes two sides to wrap around the rail.

In an exemplary aspect, the fastener is a bolt and the base member includes a threaded hole to accept the bolt.

In an exemplary aspect, the slider member includes two legs to fit in the first set of grooves of the base member, and each of the two legs includes a hole to receive a pin used to hold the slider member, the base member, and a spring member together as the assembly.

In an exemplary aspect, the base member includes a second set of grooves to allow the base member to be attached to a slot in the rail and to move within the slot of the rail based on tightening or loosening of the fastener.

In an exemplary aspect, the base member and the slider member are made from extruded aluminum and machined into final form.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
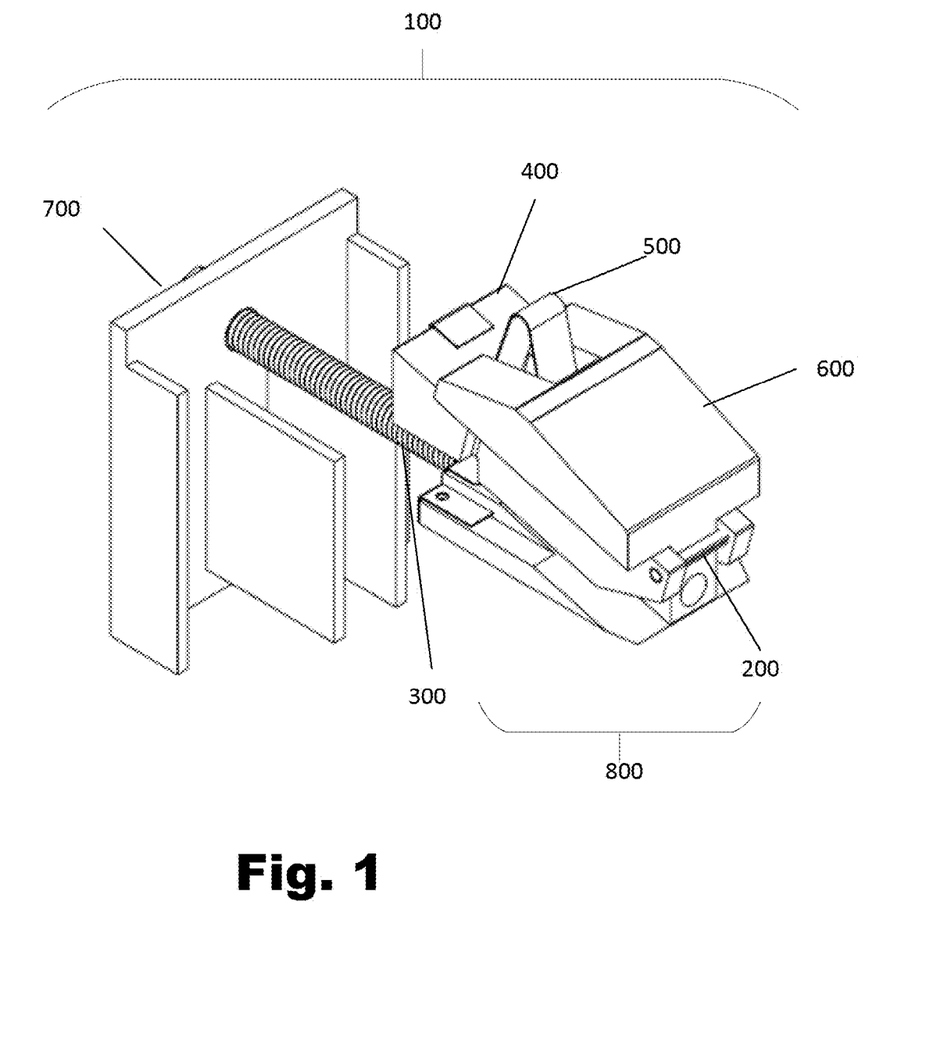
FIG. 1 is a perspective drawing of a universal end clamp according to exemplary aspects of the present disclosure.

Referring now to the drawings, wherein like reference numerals designate identical or corresponding parts throughout the several views, FIG. 1 is a perspective view of a universal end clamp 100 according to exemplary aspects of the present disclosure. The universal end clamp 100 includes a base member 600 that receives a slider member 400 and a spring member 500. As explained in greater detail below, the base member has a slot into which the spring member 500 is inserted. The slider member 400 has a central slot to receive a central portion of the base member 600 and the spring member 500 such that the spring member 500 is sandwiched between the base member 600 and the slider member 400. Grooves on either side of the base member 600 receive the two legs of the slider member 400 that flank the central slot of the slider member 400.

Once the spring member 500 and slider member 400 are attached to the base member 600, a pin 200 is inserted into holes at one end of the slider member 400 in order to hold the slider member 400, spring member 500, and base member 600 together as an assembly 800.

The base member 600 receives a bolt 300 to which a cap member 700 is attached. The cap member 700 covers the end of a rail once the universal end clamp 100 is installed on the rail. The bolt 300 serves to draw the assembly 800 toward the cap member 700 in order to cause the assembly 800 to clamp down on a flange of a solar module in order to secure the solar module to the rail. This is explained in greater detail below.

Figure 2:
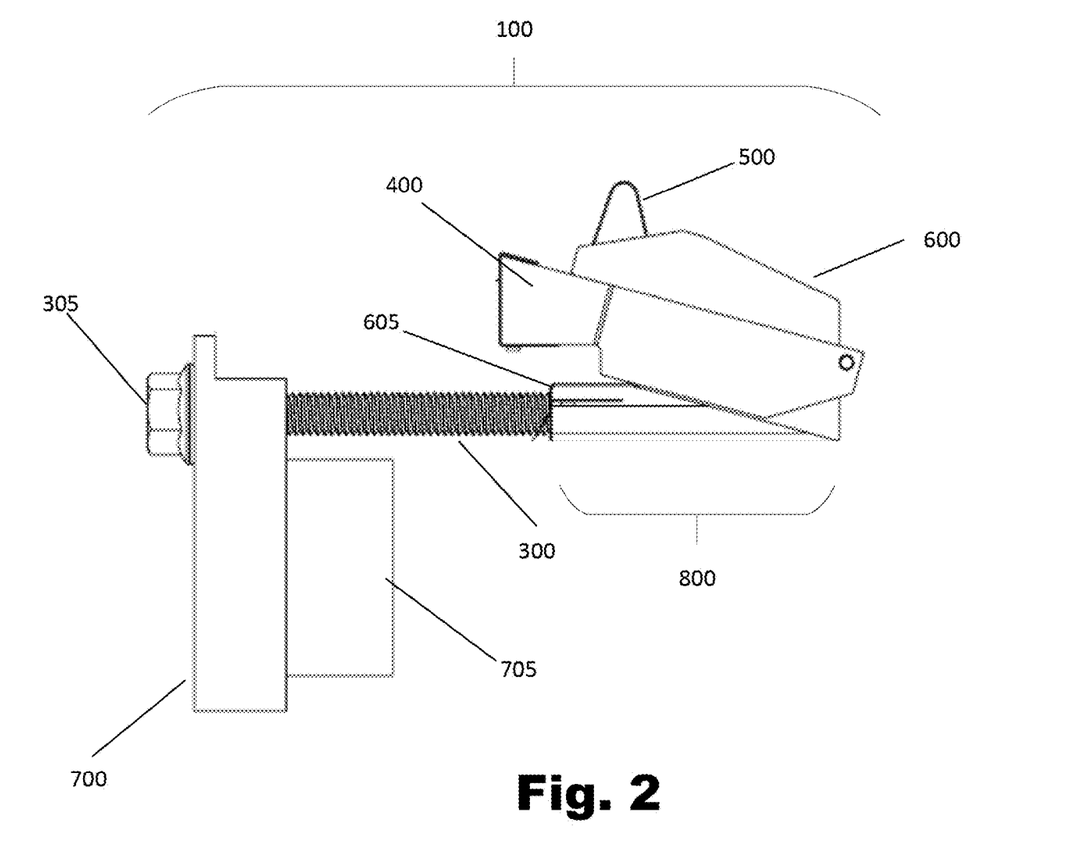
FIG. 2 is a side view of the universal end clamp according to exemplary aspects of the present disclosure.

FIG. 2 is a side view of the universal end clamp 100 according to exemplary aspects of the present disclosure. As illustrated in FIG. 2, the bolt 300 is received by the base member 600 through a hole 605 in a lower section thereof. The hole 605 is threaded to engage with the threads of the bolt 300 and cause the bolt 300 to be inserted further into the base member 600, or to be drawn out of the base member 600, by turning the bolt 300. The head 305 of the bolt is illustrated as a hexagonal head with an integrated skirt that prevents the bolt 300 from loosening once tightened. Of course, other configurations for the bolt head 305 are possible without departing from the scope of the present disclosure. For example, the bolt may have a head that is slotted, a head that accepts a Philips screwdriver, a head that accepts an Allen wrench, or any combination thereof. The anti-loosening mechanism by which the bolt is prevented from loosening once tightened is not limited to the bolt head skirt illustrated in FIG. 2. This mechanism may also be, without limitation, a locking washer, such as a split washer or tooth washer, and an adhesive compound may also be used to in addition to, or instead of, the anti-loosening mechanism. One of ordinary skill in the art will recognize that numerous other variations are possible without limitation.

In FIG. 2, the cap member 700 is illustrated as including fins 705 which engage with an opening in the rail as will be described below. The cap member 700 also includes a hole through which the bolt 300 passes, but this hole is not threaded to prevent binding and to allow smooth operation of the universal end clamp 100. Preferably, though not required, a diameter of the hole in the cap member 700 is slightly larger than a diameter of the bolt.

Figure 3:
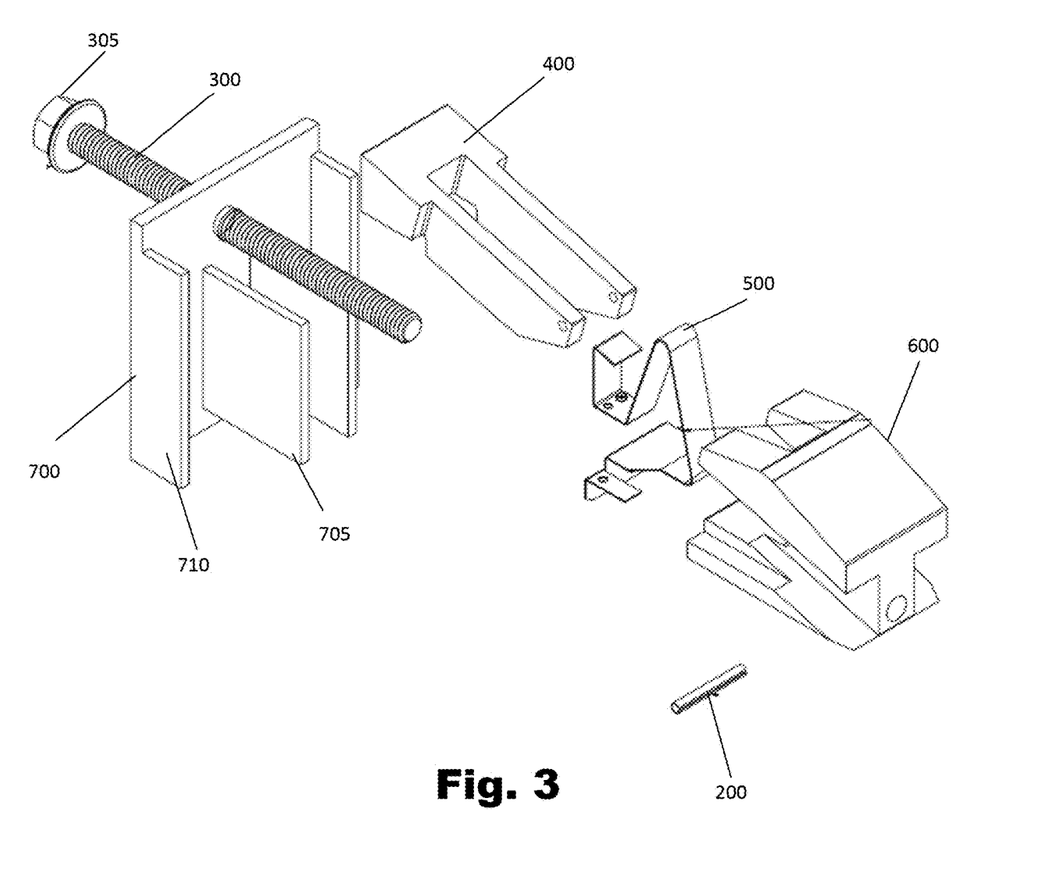
FIG. 3 is an exploded view of the universal end clamp according to exemplary aspects of the present disclosure.

FIG. 3 is an exploded view of the components that for the universal end clamp 100 according to exemplary aspects of the present disclosure. The slider member 400, spring member 500, base member 600, and cap member 700 are all described in detail below. However, FIG. 3 illustrates the pin 200 which is used to hold the slider member 400 in place once the slider member 400 and spring member 500 are attached to the base member 600. This pin 200 may be a rolled spring steel pin that is split along its length to allow for compression of its cross-sectional diameter during installation, and to exert a force against the holes of the slider member 400 once inserted to prevent the pin 200 from falling out. Of course, the pin 200 may be other types of pins as one of ordinary skill will recognize. For example, the pin 200 may be a solid pin with a hole drilled at one end to accept a cotter to hold it in place once inserted into the slider member 400. Instead of a cotter pin, a groove can be cut at one end of the pin 200 in order to accept a retaining ring washer. The pin 200 may also be brazed in place once installed in the slider member 400 or may be a bolt that screws into the slider member. Thus, numerous variations for the pin 200 are possible without departing from the scope of the present disclosure.

Both the pin 200 and the bolt 300 will be exposed to the elements since the universal end clamp 100 is used in outdoor applications. Therefore, the pin 200 and the bolt 300 is preferably made from a material that is impervious to wind, sun, precipitation, cold, and heat. Such materials may include, without limitation, stainless steel, galvanized metal, Zinc plated metals, alloyed metals, aluminum, composites materials, ceramics, carbon fiber, etc.

Figure 4:
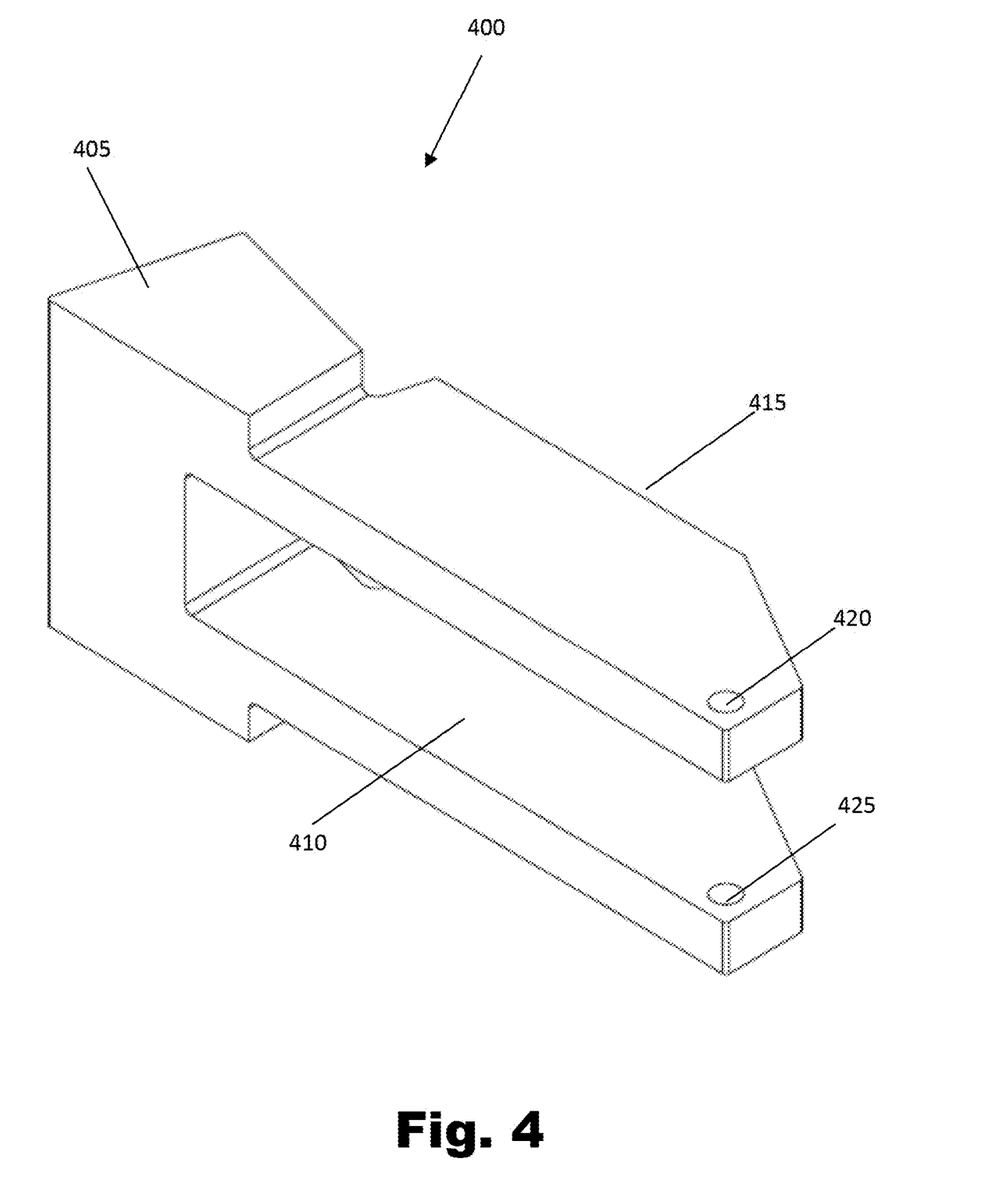
FIG. 4 is a perspective view of a slider member of the universal end clamp according to exemplary aspects of the present disclosure.

FIG. 4 is a perspective view of the slider member 400 of the universal end clamp 100 according to exemplary aspects of the present disclosure. The slider member 400 includes a solid head 405 that clamps down on a flange of a solar module as described below. From the head 405 extend two legs 415 that form a slot 410 therebetween. As discussed above, the slot 410 receives both the spring member 500 and a central portion of the base member 600. Two holes 420 and 425 are disposed at the ends of the legs 415 that are furthest from the head 405. These are the holes that receive the pin 200 in order to hold the entire assembly 800 together.

The slider member 400 is illustrated as a one-piece component that may be made of extruded aluminum that is machined into final form. However, the slider member 400 may also be formed from other materials, such as steel, metal alloys, and ceramics, depending on the application in which the universal end clamp 100 will be used. The slider member 400 may also be molded or die cast instead of extruded and machined. Thus, the material used to make the slider member 400, and the manner of making the slider member 400, is not limiting upon the present disclosure.

Figure 5:
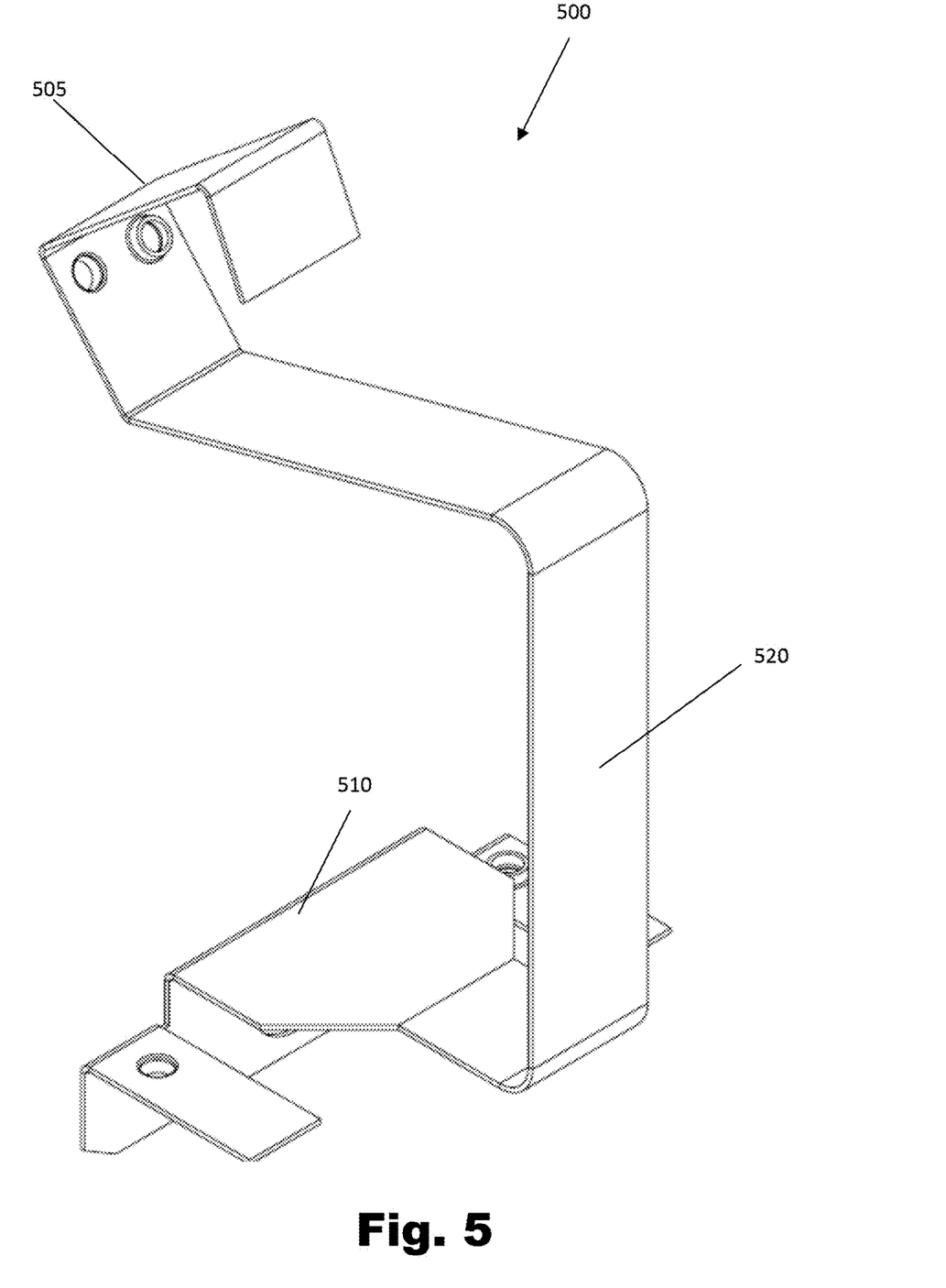
FIG. 5 is a perspective view of a spring member of the universal end clamp according to exemplary aspects of the present disclosure.

FIG. 5 is a perspective view of the spring member 500 of the universal end clamp 100 according to exemplary aspects of the present disclosure. As illustrated, the spring member 500 includes a portion 505 that wraps around the head 405 of the slider member 400 and is attached to the head 405. The base 510 of the spring member 500 is also attached to the base member 600. A vertical section 520 of the spring member 500 is inserted into a slot of the base member 600.

As described below, the spring member 500 serves to maintain the slider member 400 and the base member 600 in a starting, or default, orientation relative to each other when other forces, such as the tightening of the bolt 300, are not exerted on the assembly 800. Once external forces are applied through the tightening of the bolt 300, the spring member deflects to allow the slider member 400 and the base member 600 to move relative to each other in order to clamp down on a flange of a solar module.

As can be appreciated, the spring member 500 may be made from a variety of different materials, one example of which is spring steel. The spring member 500 may be stamped from a blank, and bent and machined into its final form. Though the spring member 500 is illustrated as being made from flat metal stock, the spring member 500 may also be formed from rounded metal stock, such as wire, without departing from the scope of the present disclosure. Other variations are also possible without limitation.

Figure 6:
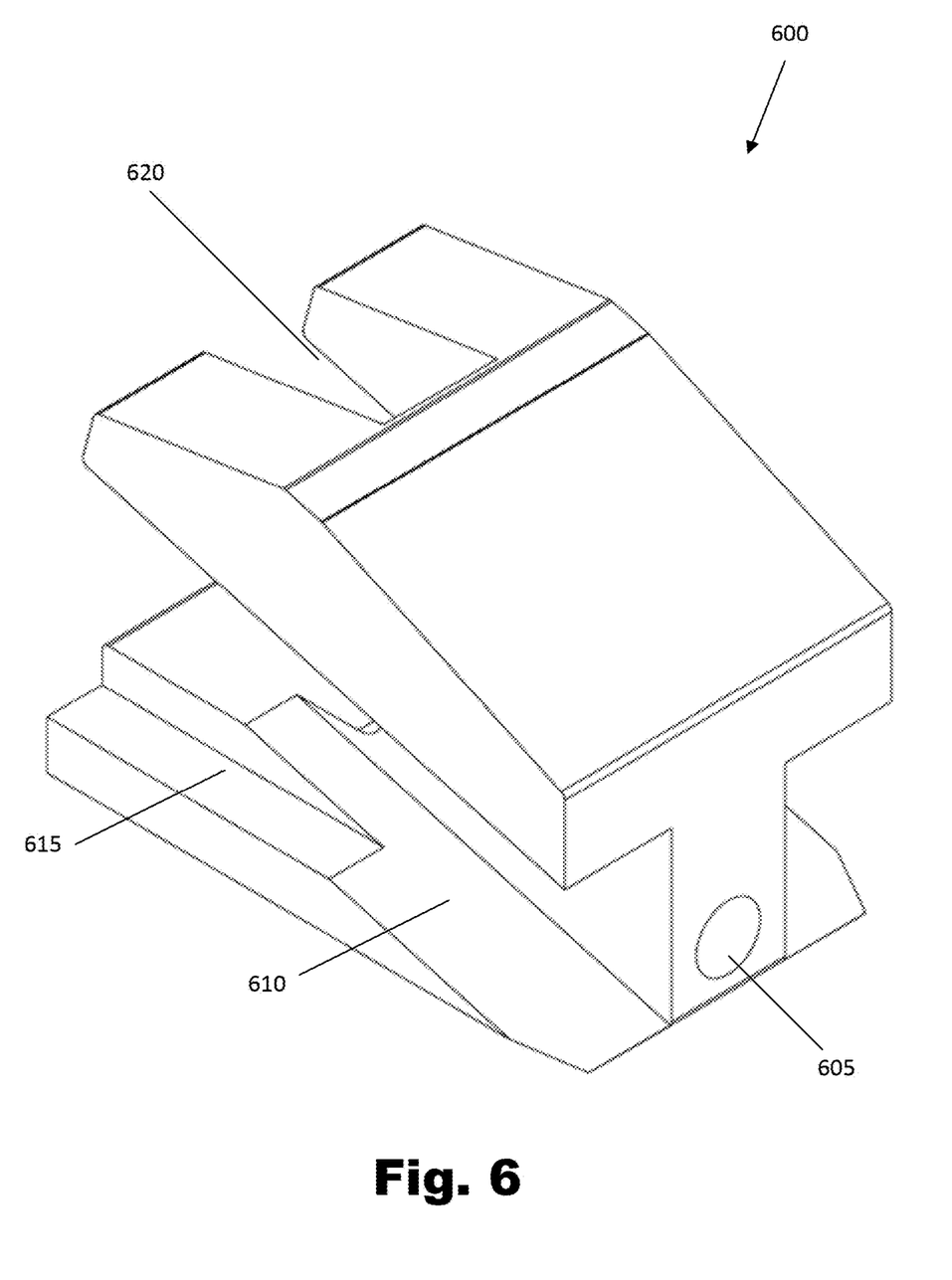
FIG. 6 is a perspective view of a base member of the universal end clamp according to exemplary aspects of the present disclosure.

FIG. 6 is a perspective view of a base member 600 of a universal end clamp 100 according to exemplary aspects of the present disclosure. The base member 600 includes a slot 620 into which the spring member 500 is inserted, as discussed above. The sides of the base member include first grooves 610 to receive the legs 415 of the slider member 400, and second grooves 615 to engage with a slot of the rail as will be described below.

The base member 600 also includes a hole 605 to receive the bolt 300. As already discussed, the hole may be threaded to match the threads of the bolt 300 thereby acting as a nut. Alternatively, the hole 605 may not be threaded and, instead, a nut may be attached to the end of the base member 600 in order to thread onto the bolt 300. The nut may be attached in a way that prevents the nut from spinning as one of ordinary skill will recognize.

The base member 600 is formed from extruded aluminum and machined into its final form. However, the base member 600 may also be formed of other materials, such as steel, metal alloys, and/or ceramics, and may be die cast instead of extruded and machined. Thus, the method and materials used to manufacture the base member 600 are not limiting upon the present disclosure.

Figure 7:
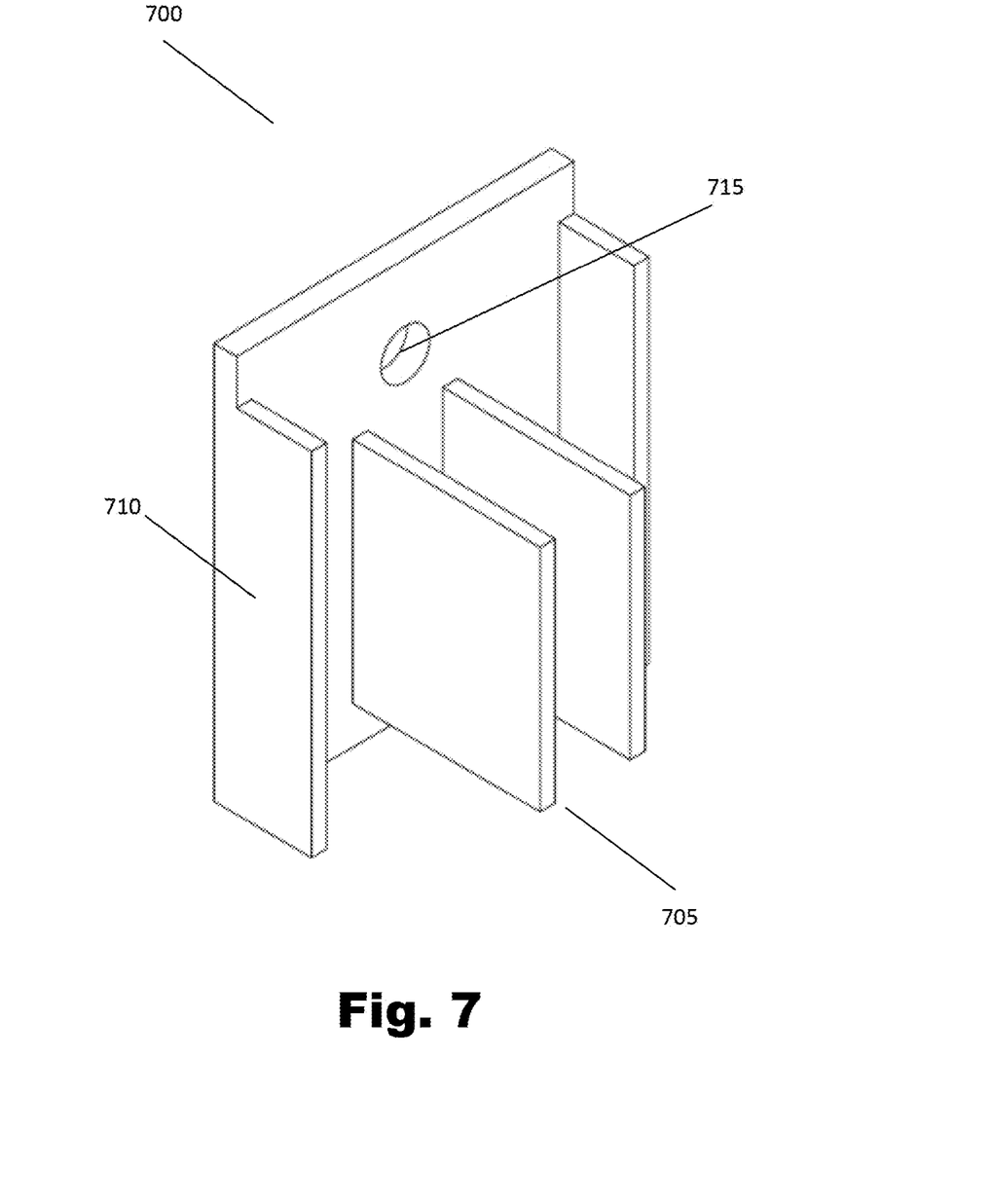
FIG. 7 is a perspective view of a cap member of the universal end clamp according to exemplary aspects of the present disclosure.

FIG. 7 is a perspective view of a cap member 700 of the universal end clamp according to exemplary aspects of the present disclosure. The cap member 700 includes fins 705 that engage with a central opening of a rail, as will be discussed below. The cap member 700 also includes side sections 710 which surround the end of the rail once the cap member 700 is installed. As noted previously, the cap member 700 has a hole 715 through which the bolt 300 passes, but that is not threaded to prevent binding during installation.

While the cap member 700 may be made of extruded aluminum and machined, the cap member 700 is preferably finished to match the color and texture of the rail. For example, the cap member 700 may be anodized with a particular color to match the rail, or may be painted or polished. The cap member 700 may also be made from other metals, alloys, and/or ceramics without limitation.

Next, installation of a solar module using a universal end clamp 100 according to exemplary aspects of the present disclosure is described with reference to FIGS. 8A-8B, 9A-9B, 10A-10B, 11A-11B, 12A-12B, and 13A-13B.

Figure 8A:
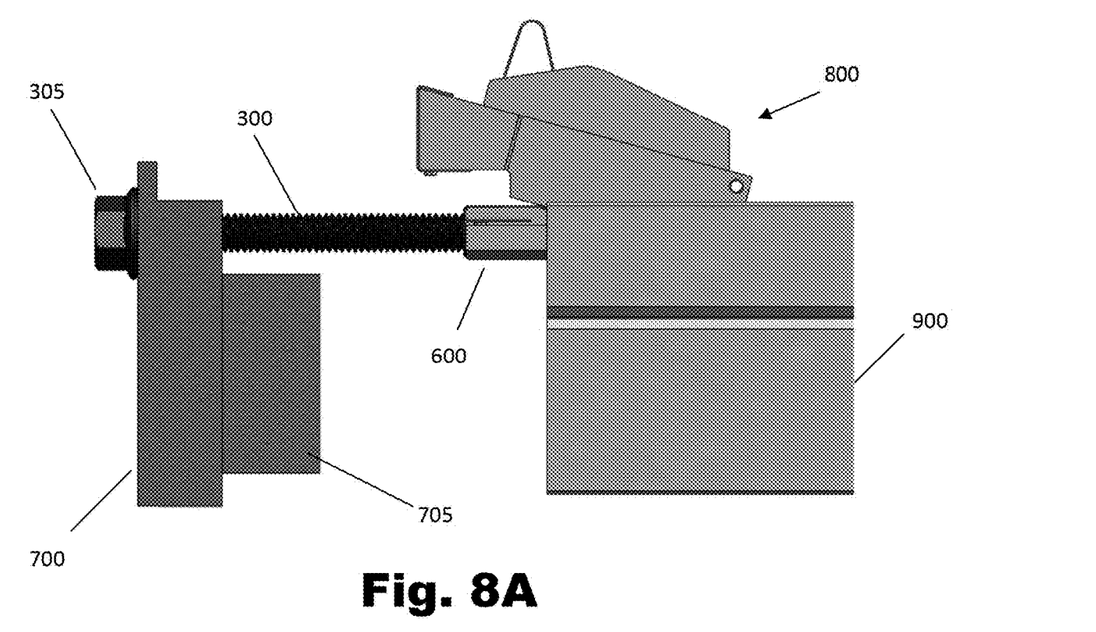
FIG. 8A is a side view of installation of a universal end clamp on a rail, according to exemplary aspects of the present disclosure.
Figure 8B:
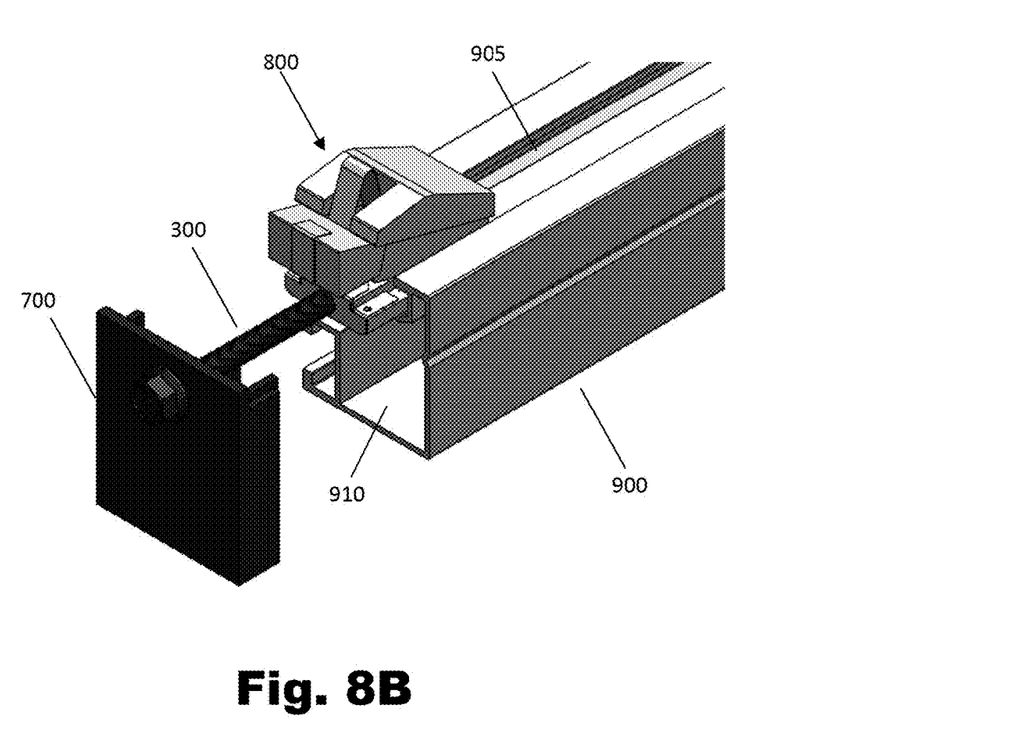
FIG. 8B is a perspective view of installation of a universal end clamp on a rail, according to exemplary aspects of the present disclosure.

FIG. 8A is a side view, and FIG. 8B is a perspective view, of installation of a universal end clamp 100 on a rail 900 according to exemplary aspects of the present disclosure. As illustrated, the assembly 800 is inserted into a slot 905 of the rail 900 such that the second grooves 615 of the base member 600 enter the slot 905 to hold the assembly to the rail 900. The cap member 700 is also aligned such that the fins 705 of the cap member 700 can enter the opening 910 of the rail.

Figure 9A:
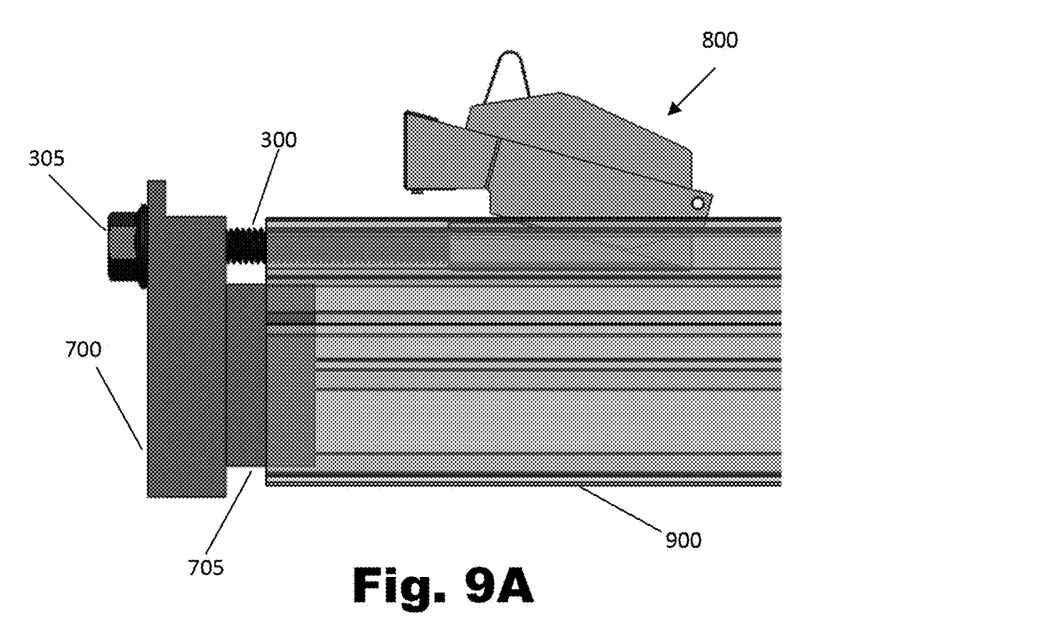
FIG. 9A is another side view of installation of a universal end clamp on a rail, according to exemplary aspects of the present disclosure.
Figure 9B:
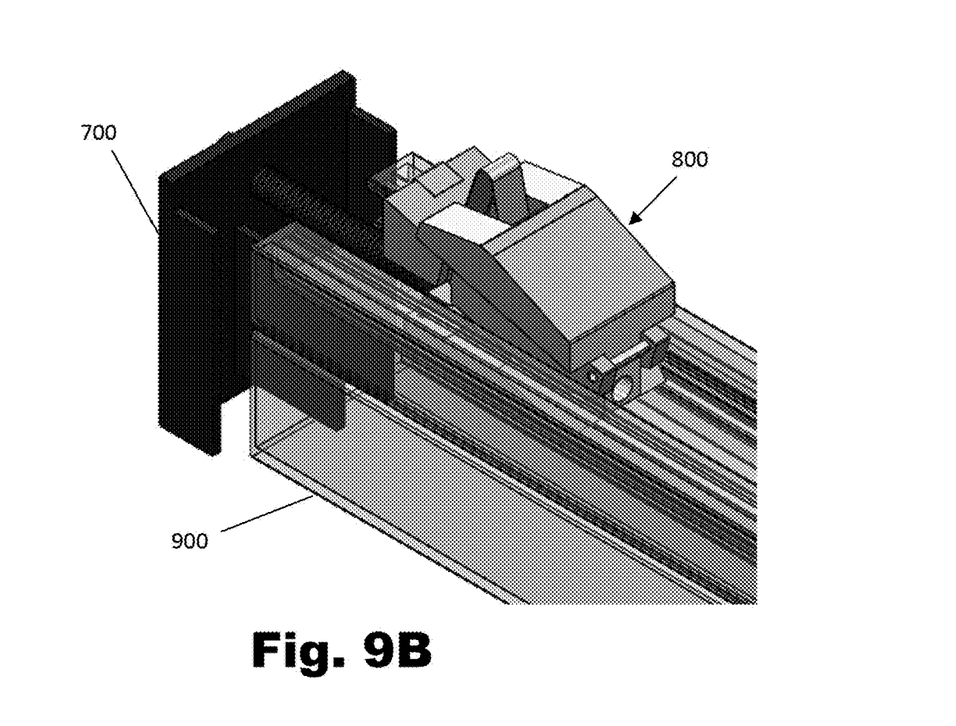
FIG. 9B is another perspective view of installation of a universal end clamp on a rail, according to exemplary aspects of the present disclosure.
Figure 10A:
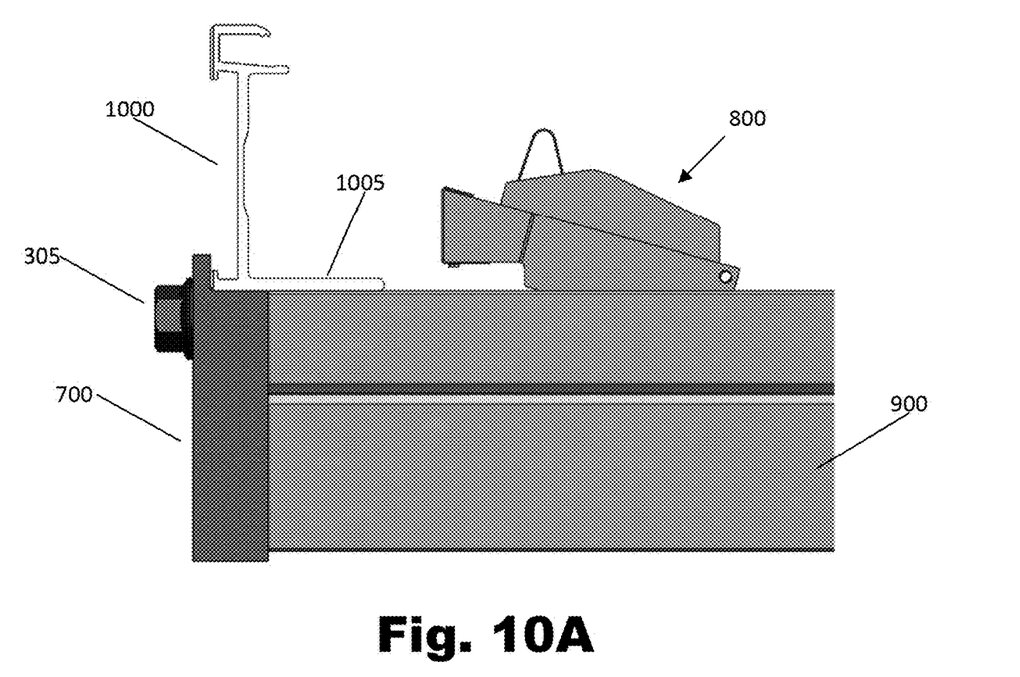
FIG. 10A is a side view of installation of a solar module onto a rail including a universal end clamp, according to exemplary aspects of the present disclosure.
Figure 10B:
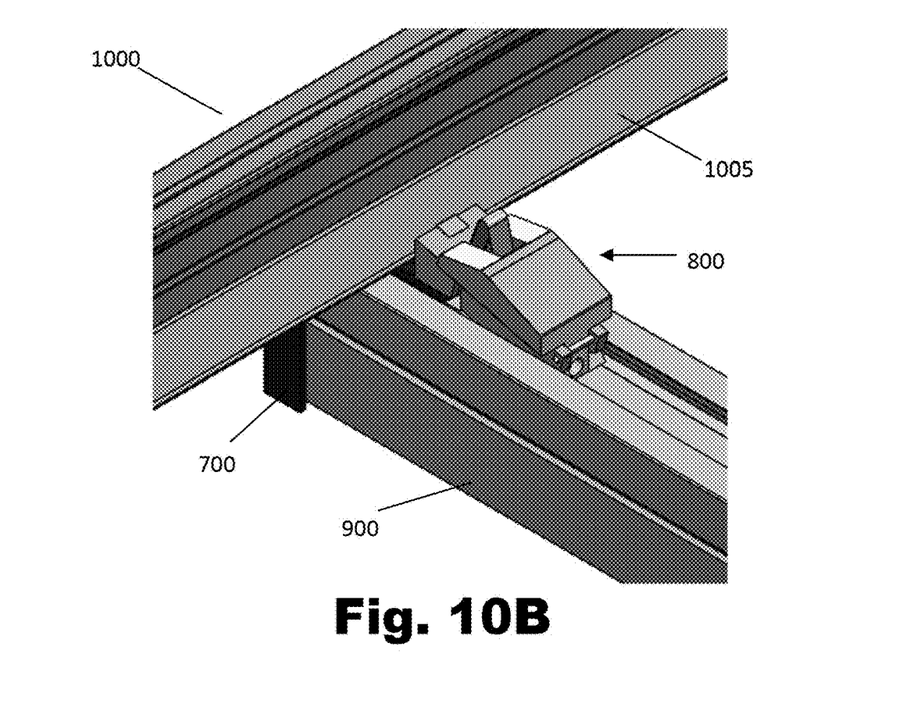
FIG. 10B is a perspective view of installation of a solar module onto a rail including a universal end clamp, according to exemplary aspects of the present disclosure.
Figure 11A:
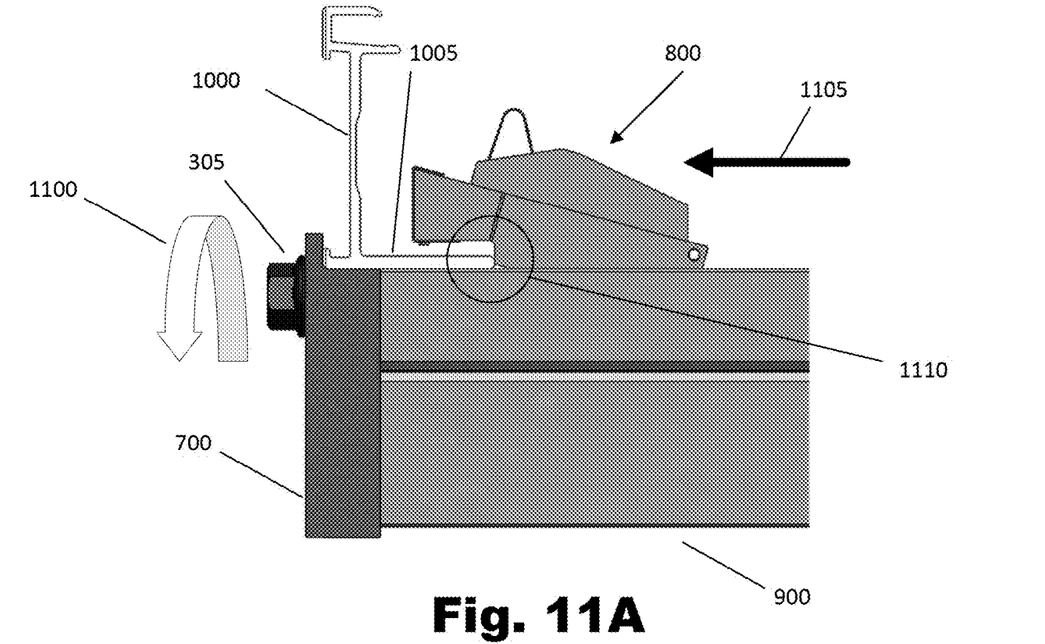
FIG. 11A is another side view of installation of a solar module onto a rail including a universal end clamp, according to exemplary aspects of the present disclosure.
Figure 11B:
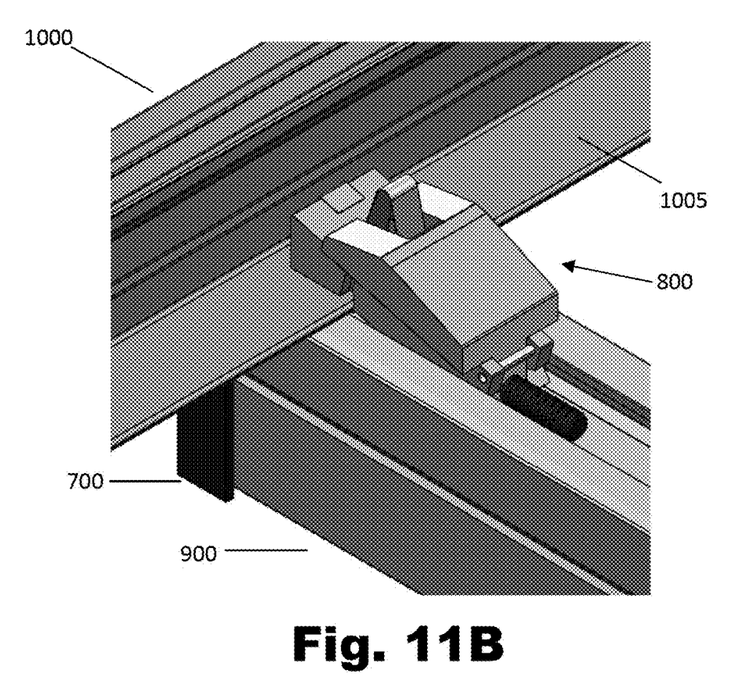
FIG. 11B is another perspective view of installation of a solar module onto a rail including a universal end clamp, according to exemplary aspects of the present disclosure.
Figure 12A:
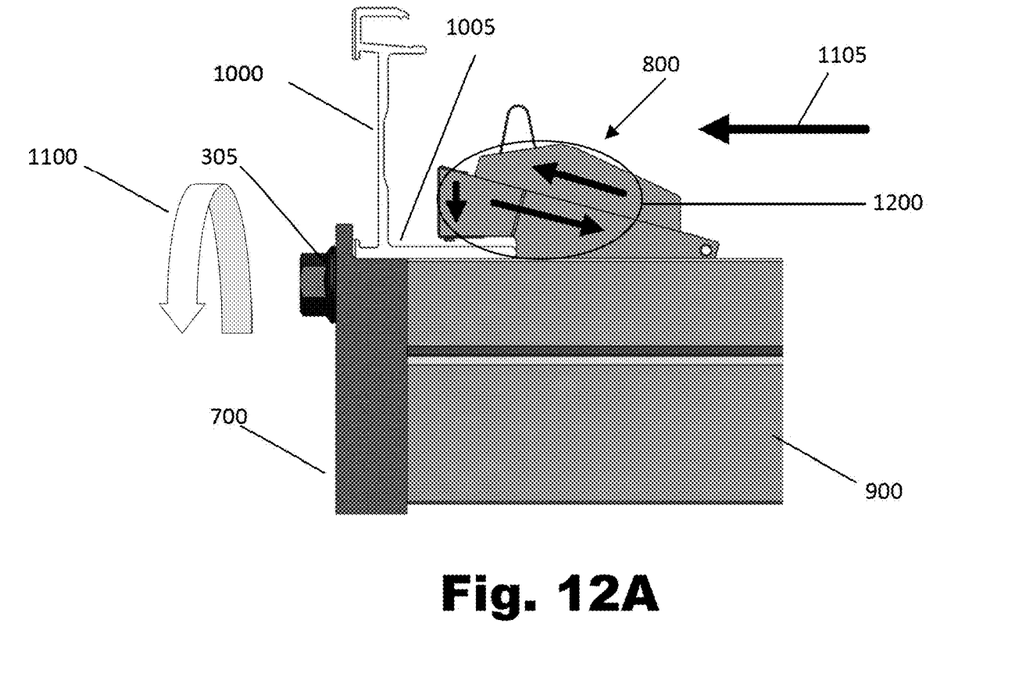
FIG. 12A is a further side view of installation of a solar module onto a rail including a universal end clamp, according to exemplary aspects of the present disclosure.
Figure 12B:
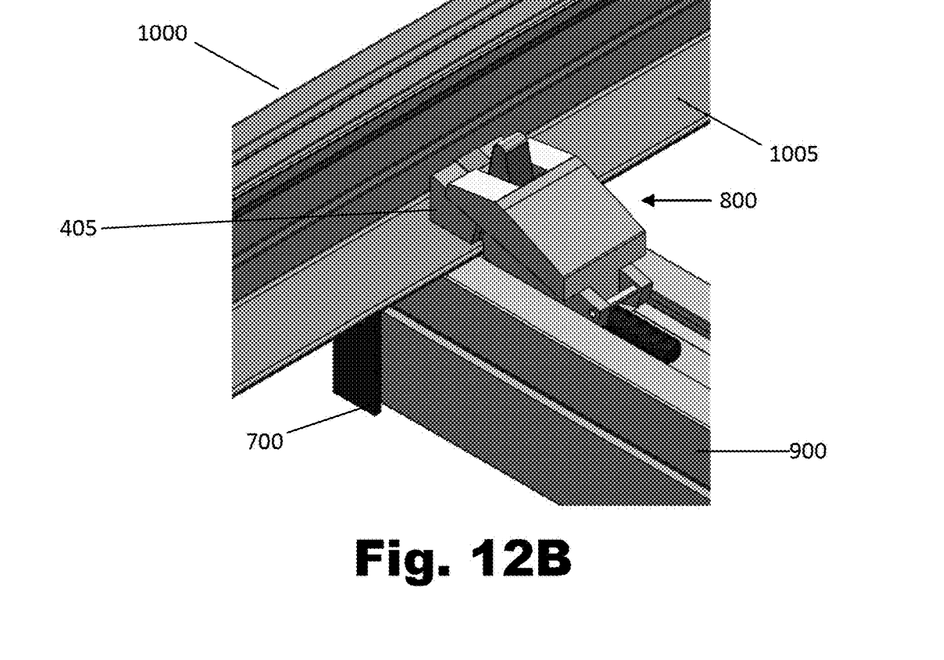
FIG. 12B is a further perspective view of installation of a solar module onto a rail including a universal end clamp, according to exemplary aspects of the present disclosure.

As illustrated in FIGS. 9A and 9B, once the assembly 800 is mounted on the rail it is slid back along the slot 905 of the rail until the fins 705 of the cap member 700 enter the opening 905 and the cap member 700 is seated into the end of the rail 900. The final position of the universal end clamp 100 prior to engaging with a solar module 1000 is illustrated in FIGS. 10A and 10B. Note that in the position illustrated in FIGS. 10A and 10B the bolt 300 of the universal end clamp 100 has not yet been tightened.

Also illustrated in FIGS. 10A and 10B, a solar module 1000 is placed on the rail 900 such that it butts against the cap member 700 and such that the flange 1005 of the solar module sits on the rail between the cap member 700 and the assembly 800. Then the bolt 300 is tightened by turning its head 305 as illustrated by the arrow 1100 in FIG. 11A. As the bolt 300 is tightened, the assembly 800 is drawn towards the flange 1005 of the solar module 1000 until the bottom of the legs 415 of the slider member 400 contact the flange 1005. This movement is illustrated by the arrow 1105. At this point, further tightening of the bolt 300 causes the base member 600 to continue moving towards the cap member 700, but the slider member 400 is prevented from doing so by the flange 1005 of the solar module 1000. This causes the slider member 400 and the base member 600 to move relative to each other, and causes the head 405 of the slider member 400 to move downward to contact the flange 1005 of the solar module 1000. The movement of the slider member 400 and the base member 600 is illustrated by the arrows 1200 in FIG. 12A. As can be seen from FIG. 12B, the head 405 of the slider member 400 begins to engage with the flange 1005 of the solar module.

Figure 13A:
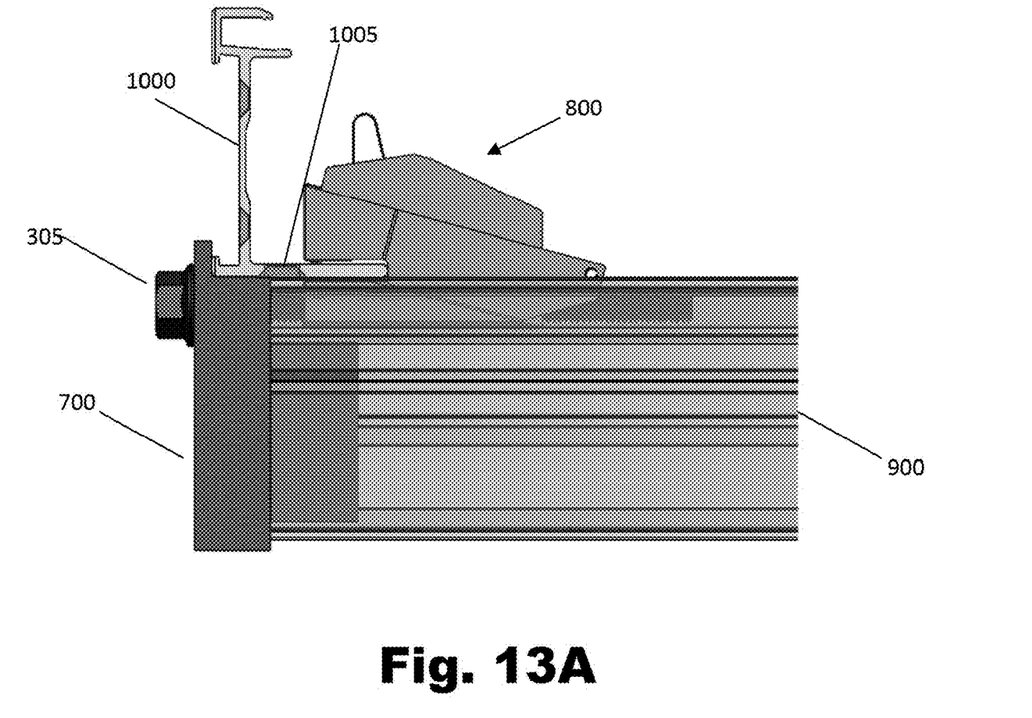
FIG. 13A is a side view of a solar module installed on a rail and held by a universal end clamp, according to exemplary aspects of the present disclosure.
Figure 13B:
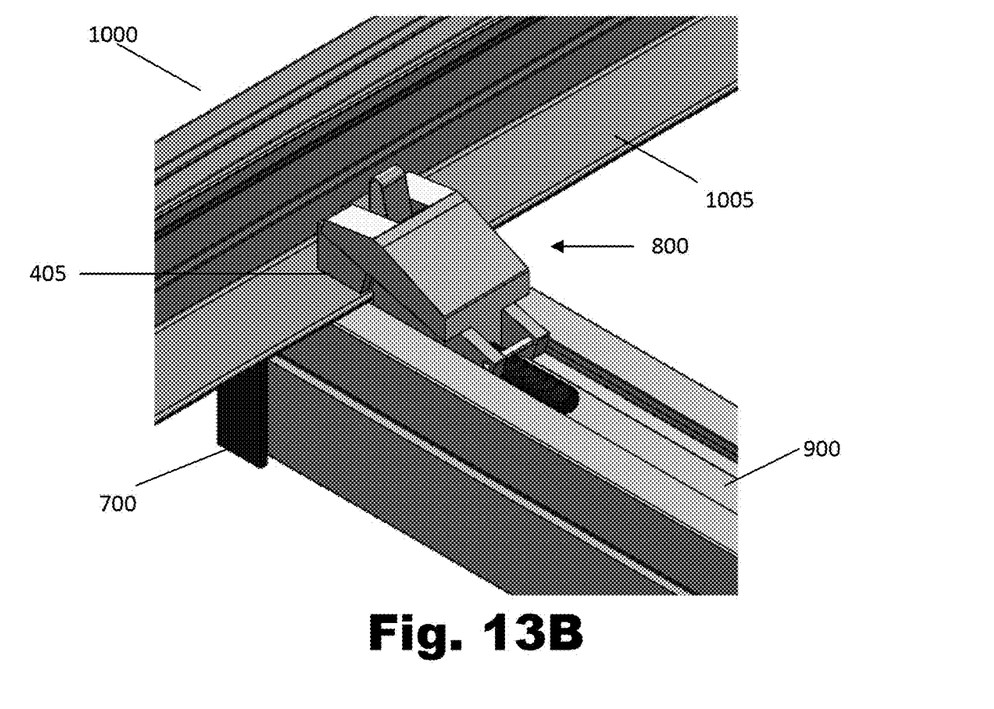
FIG. 13B is a perspective view of a solar module installed on a rail and held by a universal end clamp, according to exemplary aspects of the present disclosure.

FIGS. 13A and 13B illustrate the final position of the solar module 100, the rail 900, and the universal end clamp 100 according to exemplary aspects of the present disclosure. Once the bolt 300 is fully tightened, the cap member 700 is pressed firmly against the end of the rail 900, and the head 405 of the slider member 400 is pressed firmly against the flange 1005 of the solar module 1000. Thus, the solar module 1000 is held firmly in place. Advantageously, the universal end clamp 100 can be operated by turning a single bolt 300 in order to firmly clamp the solar module 1000 to the rail 900. Releasing the solar module 1000 is accomplished by loosening the bolt 300 so that the assembly 800 moves away from the flange 1005 of the solar module and, through operation of the spring member 500, the slider member 400 and the base member 600 both return to their original, default positions.

As can be appreciated, variations to the universal end clamp 100 can be made without departing from the scope of the present disclosure. For example, in applications where the rail 900 does not include an opening 910, the fins 705 of the cap member 700 may be omitted. The second grooves 615 of the base member 600 may also be modified to fit any number of rail variations. One of ordinary skill will also recognize numerous other variations of the present disclosure in light of the above teachings. It is therefore to be understood that within the scope of the appended claims, the invention may be practiced otherwise than as specifically described herein.

Exemplary Embodiments

The following are exemplary embodiments of the inventive concepts described herein. As can be appreciated, these embodiments may be modified as described above and may be combined, in whole or in part, without limitation.

(1) An end clamp for installation of a solar module, the end clamp comprising: a cap member configured to be installed in an opening of a rail; an assembly including a slider member and a base member; and a fastener configured to attach the cap member to the assembly, wherein the slider member is configured to move relative to the base member to clamp down on a flange of the solar module.

(2) The end clamp of embodiment (1), wherein the base member includes a first set of grooves to receive the slider member, and at least a portion of each groove of the first set of grooves is angled to allow the slider member to pivot as the slider member moves relative to the base member.

(3) The end clamp of any one of embodiments (1)-(2), wherein the slider member moves relative to the base member in response to tightening of the fastener.

(4) The end clamp of any one of embodiments (1)-(3), wherein the assembly further includes a spring member disposed between the slider member and the base member, and configured to return the slider member to an original position relative to the base member when the fastener is loosened.

(5) The clamp of any one of embodiments (1)-(4), wherein the cap member includes at least one fin configured to be inserted into the opening of the rail in order to align the cap member relative to the rail.

(6) The clamp of any one of embodiments (1)-(5), wherein the cap member further includes two sides configured to wrap around the rail.

(7) The clamp of any one of embodiments (1)-(6), wherein the fastener is a bolt and the base member includes a threaded hole to accept the bolt.

(8) The clamp of any one of embodiments (1)-(7), wherein the slider member includes two legs configured to fit in the first set of grooves of the base member, and each of the two legs includes a hole to receive a pin used to hold the slider member, the base member, and a spring member together as the assembly.

(9) The clamp of any one of embodiments (1)-(8), wherein the base member includes a second set of grooves configured to allow the base member to be attached to a slot in the rail and to move within the slot of the rail based on tightening or loosening of the fastener.

(10) The claim of any one of embodiments (1)-(10), wherein the base member and the slider member are made from extruded aluminum and machined into final form.

The invention claimed is:

1. An end clamp for installation of a solar module, the end clamp comprising:
    a cap member configured to cover an end of a rail;
    an assembly including:
        a base member,
        a slider member straddling a portion of the base member,
        a spring member disposed to wrap around an end of the base member and to extend between the base member and the slider member; and
    a fastener to attach the cap member to the assembly,
        wherein the slider member is configured to move relative to the base member to clamp down on a flange of the solar module.

2. The end clamp according to claim 1, wherein the base member includes a first set of grooves to receive the slider member, and at least a portion of each groove of the first set of grooves is angled to allow the slider member to pivot as the slider member moves relative to the base member.

3. The end clamp according to claim 1, wherein the slider member moves relative to the base member in response to tightening of the fastener.

4. The end clamp according to claim 3, wherein the spring member is configured to return the slider member to an original position relative to the base member when the fastener is loosened.

5. The clamp according to claim 1, wherein the cap member includes at least one fin configured to be inserted into an opening of the rail in order to align the cap member relative to the rail.

6. The clamp according to claim 5, wherein the cap member further includes two sides configured to wrap around the rail.

7. The clamp according to claim 1, wherein the fastener is a bolt and the base member includes a threaded hole to accept the bolt.

8. The clamp according to claim 2, wherein the slider member includes two legs configured to fit in the first set of grooves of the base member, and each of the two legs includes a hole to receive a pin used to hold the slider member, the base member, and the spring member together as the assembly.

9. The clamp according to claim 2, wherein the base member includes a second set of grooves configured to allow the base member to be attached to a slot in the rail and to move within the slot of the rail based on tightening or loosening of the fastener.

10. The end clamp according to claim 1, wherein the base member and the slider member are made from extruded aluminum and machined into final form.

11. An end clamp comprising:
    an end cap;
    a clamp assembly including:
        a base member,
        a slider member straddling a portion of the base member,
        a folded biasing member connected to an end of the base member and extending between the base member and the slider member; and
    a fastener to attach the end cap to the clamp assembly,
        wherein the slider member is configured to move relative to the base member to effectuate a clamp action,
        wherein the base member includes a first set of grooves to receive the slider member, and at least a portion of each groove of the first set of grooves is angled to allow the slider member to pivot as the slider member moves relative to the base member.

12. The end clamp according to claim 11, wherein the folded biasing member is a spring element of a metal strip having opposing ends folded back towards each other.

13. The end clamp according to claim 11, wherein the a portion of the folded biasing member wraps partly around the end of the base member.

14. The end clamp according to claim 11, wherein the folded biasing member wraps partly around the end of the slider member.

15. An end clamp comprising:
    an end cap;
    a clamp assembly including:
        a base,
        a slider disposed on the base,
        a folded biasing member that is connected between the base and the slider; and a fastener to attach the end cap to the clamp assembly, wherein the slider is configured to move relative to the base to effectuate a clamp action, wherein a first end of the folded biasing member and a second end of the folded biasing member are folded around adjacent portions of the slider and the base, respectively.

16. The end clamp according to claim 11, wherein the slider includes opposing protrusions that straddle the base.

17. The end clamp according to claim 11, wherein the folded biasing member is folded to extend at least partially upward between the base and the slider.

18. The end clamp according to claim 11, wherein the folded biasing member includes an aperture through an end thereof that is connected to the base member, and the fastener extends through the aperture into the base.

\* \* \* \* \*